(No Model.) 2 Sheets—Sheet 1.
J. F. STEVENSON.
CAR.
No. 552,701. Patented Jan. 7, 1896.
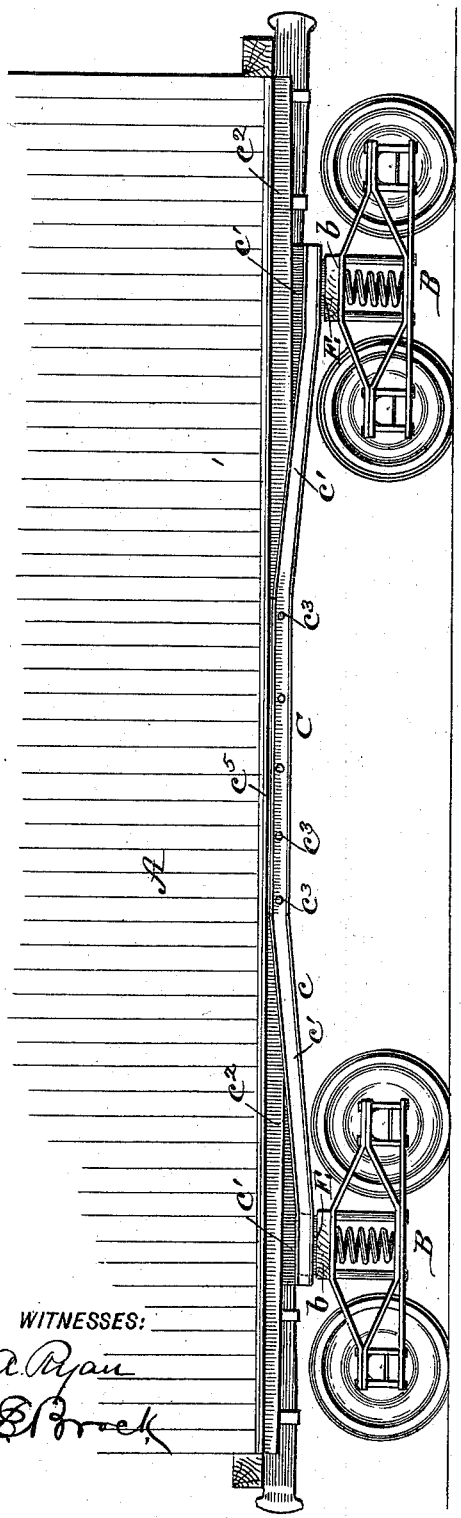
WITNESSES:
INVENTOR
John F. Stevenson.
BY
R.S. & A.P. Lacey
ATTORNEYS.

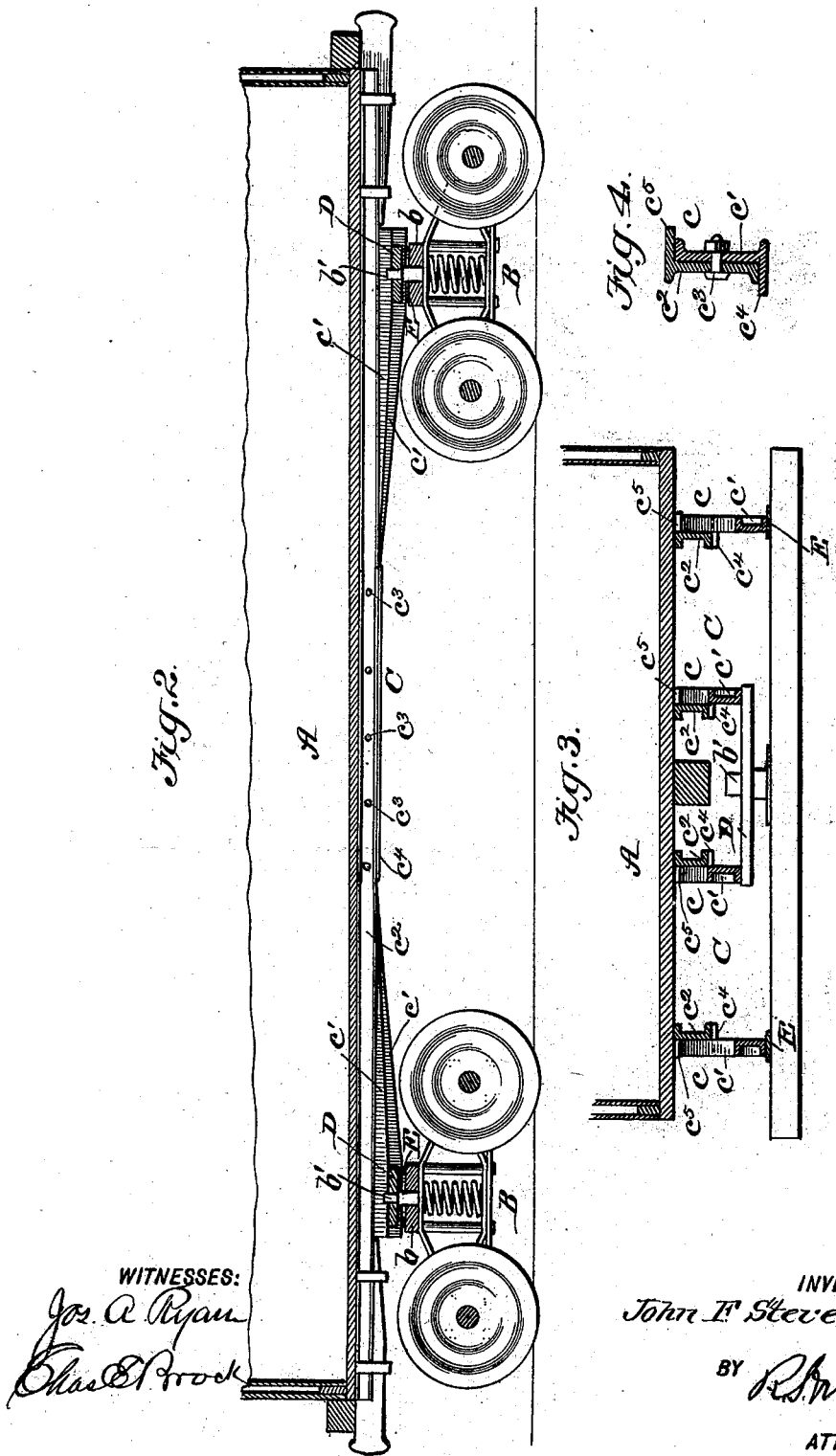

UNITED STATES PATENT OFFICE.

JOHN F. STEVENSON, OF LAMOILLE, ILLINOIS.

CAR.

SPECIFICATION forming part of Letters Patent No. 552,701, dated January 7, 1896.

Application filed October 5, 1895. Serial No. 564,767. (No model.)

*To all whom it may concern:*

Be it known that I, JOHN F. STEVENSON, of Lamoille, in the county of Bureau and State of Illinois, have invented an Improved Car, of which the following is a specification.

This invention is an improved means for supporting a car upon the wheels or trucks, and the invention is applicable to sleeping-cars and passenger and freight cars.

The object of the invention is to provide a support which virtually maintains the weight of the car at the center thereof, whereby the car is made to ride easier, thus reducing the wear and tear upon the car, and consequently upon the road-bed over which said car is caused to travel.

Another object of supporting the car from the center is to avoid the noise and rattle at the ends of the car, which are now so common in cars supported at each end upon the trucks.

With these and such other objects as may appear hereinafter the invention consists broadly in connecting the end trucks by means of a spring truss-frame, and supporting the car at the center of such frame.

The invention also consists in providing a series of brace-beams attached to the bottom of the car, and to which the spring truss-frame is connected, said beams and truss-frame adding weight or ballast to the car, whereby easier travel is secured.

The invention consists also in certain details of construction and novelties of combination, all of which will be hereinafter fully described, and pointed out in the claims.

In the drawings forming a part of this specification, Figure 1 is a side view of a car mounted upon my improved form of supporting-frame. Fig. 2 is a vertical longitudinal section of said car. Fig. 3 is a transverse section of the bottom of the car and attached support. Fig. 4 is a detail view of the support, and Figs. 5 and 6 show details of construction.

In the practical embodiment of my invention and its application I employ any form of car A, and at each end thereof I employ any suitable form of truck B, and in the drawings I have shown the usual construction of four-wheeled truck, provided with the usual bolster $b$, carrying a king-bolt or pin $b'$.

C indicates my improved form of supporting-frame, which is preferably made in four sections $c$, each section comprising the longitudinal channel-irons $c'$ $c^2$, bolted or riveted together by means of bolts or rivets $c^3$, the channel-iron $c^2$ being rigidly fixed to the bottom of the car throughout its entire length, and the interior irons $c'$ are connected at each end by means of bolster-plates D, having an opening $d$ to receive the king-bolt or pin $b'$.

The beams $c'$ $c^2$ can be formed of channel or angle iron, as shown in Figs. 5 and 6, and in either case the beam $c'$ is formed with a laterally-projecting flange $c^4$, upon which the lower edge of the beam $c^2$ rests, and the beam $c^2$ is provided with a laterally-projecting flange $c^5$, beneath which the upper edge of the beam $c'$ rests, thereby forming a rigid composite beam, which relieves the bolts of the weight which would otherwise be placed upon them.

It is not absolutely essential to construct these beams with the flanges before referred to; but in practice I prefer to do so, for the reasons specified.

As before stated, the supporting-frame is made in four sections $c$, which sections are arranged in parallel order upon the bottom of the car, and between the inner sections there is ample space for the attachment of the draw-bar and the coupling, and between the inner and outer sections there is ample space for the location of air-brakes and heating and lighting devices, such as are commonly arranged upon the bottom of sleeping or parlor cars now in use.

The draw-bar passes between the inner beams and above the bolster-plate D, and said bolster-plate is made shorter than the entire width of the car, and upon the ends of the bolster $b$ are arranged curved trucks E, upon which the ends of the outer beams $c'$ rest, said trucks being curved so that the said ends will rest thereon while the car is rounding curves, and, if desired, the ends of said beams may be provided with antifriction-rollers to reduce the wear at said point.

The beams $c'$ are trussed as shown—that is, their ends are bent downward—so that the central portions of said beams are elevated, thus supporting the car at the center some distance above the trucks.

It will be understood that the beams $c^2$ are securely bolted to the bottom of the car throughout their entire length, and that the beams $c'$ are attached to the beams $c^2$ when at their central portions.

It will also be noticed that the beams $c'$ and $c^2$ are made considerably thicker at their points of attachment, whereby a stronger composite beam is produced.

By means of the above construction I provide a supporting-frame which consists virtually in the horizontal beams attached to the bottom of the car and the truss-beams attached to the said horizontal beams and resting upon the trucks, whereby the car is supported a short distance above said trucks at the center and not at the end.

In practice I have found that a car provided with my improved form of support will run easier than one supported at each end, thereby lessening the wear and tear upon the car and consequently the wear upon the road-bed. I have also found that the noise so prevalent at each end of an ordinary car is almost entirely avoided.

Having thus described my invention, what I claim, and desire to secure by Letters Patent, is—

1. The combination, with the car, and its truck, of the spring truss frame, formed of a series of composite beams, comprising the horizontal and spring truss beams, and bolster plate connected to the interior truss beams, exterior truss beams resting upon the ends of the truck bolsters, substantially as shown and described.

2. The combination, of the horizontal beams, and the truss beams, connected to each other at their central portions, each beam having a laterally projecting flange adapted to overlap the edge of the other beam, substantially as shown and described.

In testimony whereof I affix my signature in the presence of two witnesses.

JOHN F. STEVENSON.

Witnesses:
   J. WALTER ZEBLEY,
   CHARLES M. FOGEL.